United States Patent
Chini et al.

(10) Patent No.: US 8,885,506 B2
(45) Date of Patent: Nov. 11, 2014

(54) ENERGY EFFICIENCY ETHERNET WITH ASSYMETRIC LOW POWER IDLE

(75) Inventors: Ahmad Chini, Mission Viejo, CA (US); Mehmet Tazebay, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 34 days.

(21) Appl. No.: 13/478,228

(22) Filed: May 23, 2012

(65) Prior Publication Data

US 2012/0320771 A1    Dec. 20, 2012

Related U.S. Application Data

(60) Provisional application No. 61/496,607, filed on Jun. 14, 2011.

(51) Int. Cl.
| | | |
|---|---|---|
| *H04J 1/16* | (2006.01) | |
| *H04J 3/14* | (2006.01) | |
| *H04L 1/00* | (2006.01) | |
| *H04L 12/26* | (2006.01) | |
| *H04L 12/12* | (2006.01) | |
| *H04L 12/40* | (2006.01) | |
| H04L 12/28 | (2006.01) | |
| H04J 3/16 | (2006.01) | |
| H04J 3/22 | (2006.01) | |
| G06F 1/00 | (2006.01) | |

(52) U.S. Cl.
CPC .............. *H04L 12/12* (2013.01); *Y02B 60/35* (2013.01); *Y02B 60/44* (2013.01); *Y02B 60/34* (2013.01); *H04L 12/40039* (2013.01); *Y02B 60/43* (2013.01)
USPC ........... 370/252; 370/255; 370/228; 370/469; 713/323

(58) Field of Classification Search
USPC ................. 370/255, 228, 469, 252; 713/323
See application file for complete search history.

(56) References Cited

U.S. PATENT DOCUMENTS

| | | | | |
|---|---|---|---|---|
| 7,499,412 | B2 * | 3/2009 | Matityahu et al. | 370/255 |
| 2009/0204836 | A1 * | 8/2009 | Diab et al. | 713/323 |
| 2009/0225779 | A1 * | 9/2009 | Diab et al. | 370/469 |
| 2010/0067372 | A1 * | 3/2010 | Diab | 370/228 |

FOREIGN PATENT DOCUMENTS

WO    WO 2010/019250 A2    2/2010

OTHER PUBLICATIONS

Part 3: Carrier Sense Multiple Access with Collision Detection (CSMA/CD) Access Method and Physical Layer Specifications, IEEE Std 802.3az™-2010.
Reviriego et al., Burst Transmission for Energy-Efficient Ethernet, IEEE Internet Computing, 2010.
EP Search Report, Nov. 13, 2012.

\* cited by examiner

*Primary Examiner* — Helal A Algahaim
*Assistant Examiner* — Mahmoud Ismail
(74) *Attorney, Agent, or Firm* — Duane S. Kobayashi

(57) ABSTRACT

Energy efficient Ethernet with asymmetric low power idle. Low power idle mode is typically leveraged when both direction of a link do not have data traffic to transmit. Such a requirement reduces the application of low power idle due to the frequent existence of data traffic in only one direction. An asymmetric low power idle mode enables reduction in power consumption and signal emissions even when one direction has data traffic to transmit.

15 Claims, 5 Drawing Sheets

ENERGY EFFICIENCY ETHERNET WITH ASSYMETRIC LOW POWER IDLE

This application claims priority to provisional patent application No. 61/496,607, filed Jun. 14, 2011, which is incorporated by reference herein, in its entirety, for all purposes.

BACKGROUND

1. Field of the Invention

The present invention relates generally to energy efficient Ethernet networks and, more particularly, to energy efficient Ethernet with asymmetric low power idle.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the utilization of the network link. For example, many network links are typically in an idle state between sporadic bursts of data. The transmission of idle signals on a link wastes energy and adds to the radiated emission levels. Identification of these frequent low link utilization periods can therefore provide opportunities to produce energy savings.

In other network links, however, the traffic profile can include regular or intermittent low-bandwidth traffic, with bursts of high-bandwidth traffic. Here, identification of a low link utilization period is more difficult and the potential for energy savings is reduced.

Conventionally, an energy efficiency control policy in a network device is operative to analyze the link utilization to determine whether to enter a low power idle mode to save power. As data from the two different sides of the link do not necessarily appear at the same time, identifying an opportune time to enter a low power idle mode can be difficult. What is needed therefore is a mechanism that can maximize energy savings when considering the asymmetric nature of link utilization.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy efficient Ethernet networks attempt to save power when the traffic utilization of the network is not at its maximum capacity. This serves to minimize the performance impact while maximizing energy savings. Energy efficiency can be applied asymmetrically to a link in providing an asymmetric low power idle mode that supports a configuration of a physical layer device where a first direction of communication is in an inactive state between a transmission of periodic refresh signals that are configured to maintain synchronization of said first direction of communication, and a second direction of communication continues to communicate in an active state.

The asymmetric low power idle mode can be used for traffic profiles (e.g., video surveillance camera link) that can consistently produce an asymmetric transmission scenario where one direction of the network link consistently transmits data and the other direction of the network link transmits limited amounts of data (e.g., camera control commands) infrequently. As the entry by the physical layer device into an asymmetric low power idle mode is not dependent on an absence of traffic in both directions on the network link, the asymmetric low power idle mode increases the opportunity for generating energy savings for the network link.

At a broad level, the energy efficiency control policy for a particular link in the network determines when to enter an energy saving state, what energy saving state (i.e., level of energy savings) to enter, how long to remain in that energy saving state, what energy saving state to transition to out of the previous energy saving state, etc. In one embodiment, energy efficiency control policies can base these energy-saving decisions on a combination of settings established by an IT manager and the properties of the traffic on the link itself.

Figure 1:
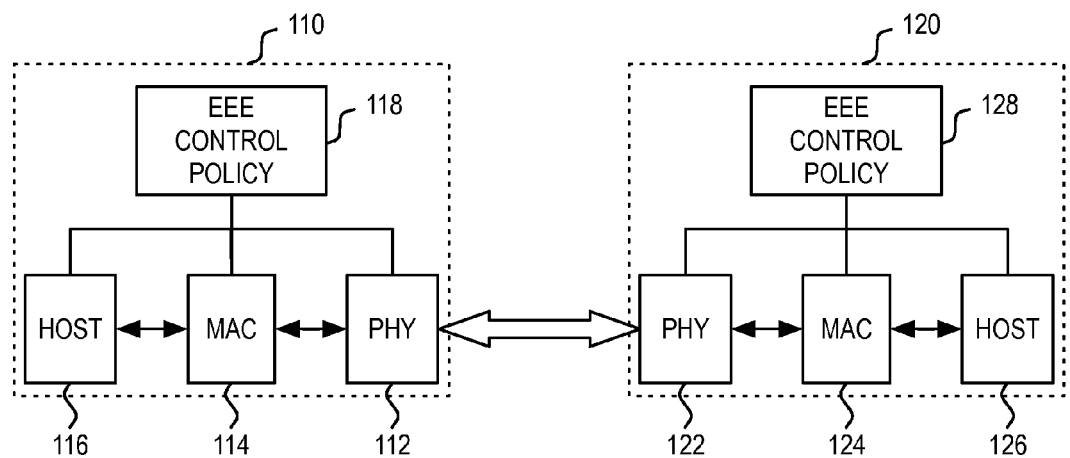
FIG. 1 illustrates an Ethernet link between link partners.

FIG. 1 illustrates an example link to which an energy efficiency control policy can be applied. As illustrated, the link supports communication between a first link partner 110 and a second link partner 120. In various embodiments, link partners 110 and 120 can represent a switch, router, endpoint (e.g., server, client, VoIP phone, wireless access point, etc.), or the like. As illustrated, link partner 110 includes physical layer device (PHY) 112, media access control (MAC) 114, and host 116, while link partner 120 includes PHY 122, MAC 124, and host 126.

In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 114 and 124 may provide the necessary services to hosts 116 and 126 to ensure that packets are suitably formatted and communicated to PHYs 112 and 122, respectively. MAC controllers 114 and 124 may comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

As FIG. 1 further illustrates, link partners 110 and 120 also include energy efficiency control policy entities 118 and 128, respectively. In general, energy efficiency control policy entities 118 and 128 can be designed to determine when to enter an energy saving state, what energy saving state (i.e., level of energy savings) to enter, how long to remain in that energy saving state, what energy saving state to transition to out of the previous energy saving state, etc.

In general, energy efficiency control policy entities 118 and 128 can comprise suitable logic, circuitry, and/or code that may be enabled to establish and/or implement an energy efficiency control policy for the network device. In various embodiments, energy efficiency control policy entities 118 and 128 can be a logical and/or functional block which may, for example, be implemented in one or more layers, including portions of the PHY or enhanced PHY, MAC, switch, controller, or other subsystems in the host, thereby enabling energy-efficiency control at one or more layers.

It is a feature of the present invention that energy efficient Ethernet such as that defined by IEEE 802.3az can provide substantial energy savings through the use of an asymmetric low power idle mode. Prior to describing the details of an asymmetric low power idle mode, a description of a general low power idle mode is first provided.

Figure 2:
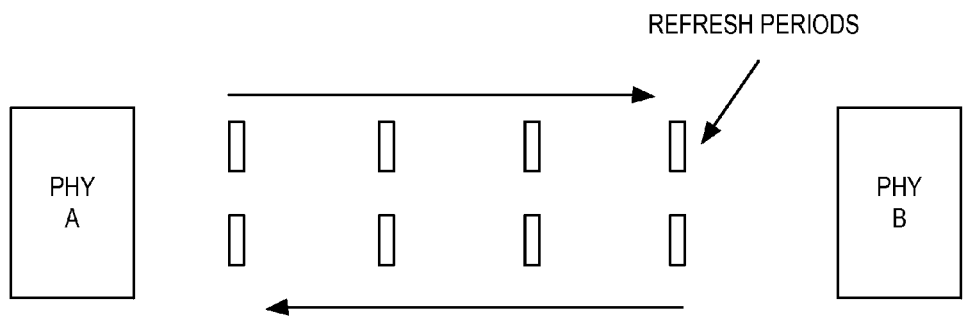
FIG. 2 illustrates refresh signaling between link partners in a low power idle mode.

A general low power idle mode can be entered when the transmitters on both sides of a link enter a period of silence when there is no data to be sent. In this scenario, both transmitters can enter a low power idle mode where both transmitters are silent except for short periods of refresh signaling. FIG. 2 illustrates the transmission of refresh signaling by both ends of the link. The use of a low power idle mode is in contrast with the conventional transmission of idle signals when there is no data to be sent. As would be appreciated, the transmission of conventional idle signals would consume just as much power as the transmission of data.

Figure 3:
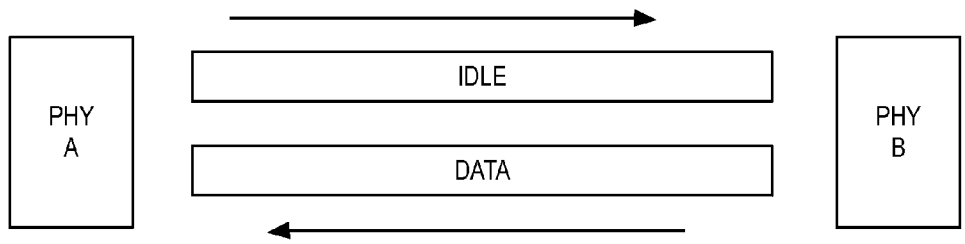
FIG. 3 illustrates signaling between link partners with one-way data.

For link applications such as gigabit Ethernet, the appearance of traffic on either end of the link would require both sides of the link to wake up. Here, one side of the link will begin to transmit data, while the other side of the link will begin to transmit idle signals. Such a scenario is illustrated in FIG. 3. One example of a traffic profile that can consistently produce such an asymmetric transmission scenario is a video surveillance camera link. In one direction of the video surveillance camera link, video information is consistently transmitted. In the other direction of the video surveillance camera link, limited amounts of data (e.g., camera control commands) are transmitted infrequently. For the latter direction, idle signals are transmitted for the remainder of the time. As this scenario illustrates, the appearance of consistent data on one end of the link would preclude the other end of the link from entering into a low power idle mode.

Figure 4:
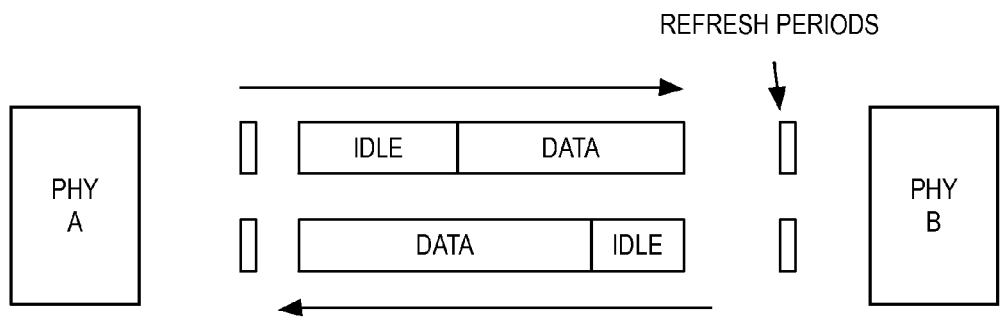
FIG. 4 illustrates usage of symmetric low power idle with asymmetric data traffic.

The inefficiencies of such a scenario are inherent to a two-way protocol where the existence of data on either end of the link would preclude the link from entering into an low power idle mode. As FIG. 4 illustrates, data sent from either end of the link will not typically appear at the same time. In other words, there is no correlation between the arrival of data on one end of the link with the arrival of data on the other end of the link. In the current specification of 1000BASE-T, for example, idle signals are sent during periods when the other side is sending data. In the present invention, it is recognized that an entry into a low power idle mode that is conditioned on the absence of data to be transmitted in both directions of the link limits the opportunities for power savings.

Figure 5:
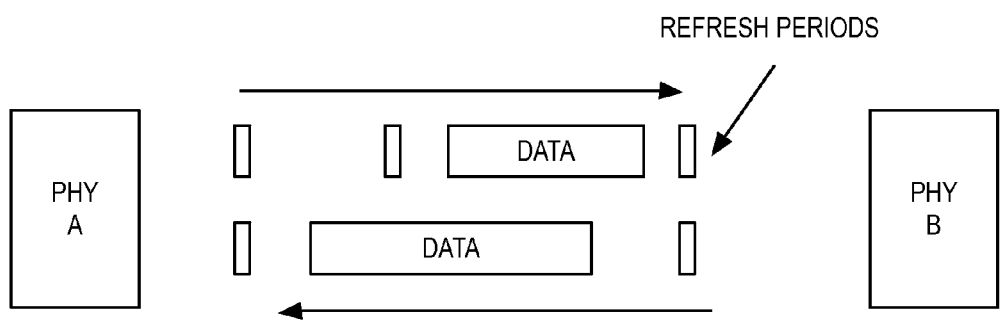
FIGS. 5 and 6 illustrate usage of asymmetric low power idle with asymmetric data traffic.

In the present invention, it is recognized that an asymmetric low power idle mode can generate significant opportunities for additional power savings. With an asymmetric low power idle mode, there could be traffic going in one direction, while the other direction of transmission only sends refresh periods and is silent in between. FIG. 5 illustrates an application of an asymmetric low power idle mode to a data pattern similar to that illustrated in FIG. 4. As illustrated, even when traffic is evenly distributed, power can be saved as data in one direction may appear in different time intervals than the other direction. Those periods during which only one direction transmitted idle signals can now be replaced by refresh signals in an asymmetric low power idle mode. The replacement of normal idle signals with refresh signals that are sent periodically after periods of inactivity represents additional energy savings on the network link.

Figure 6:
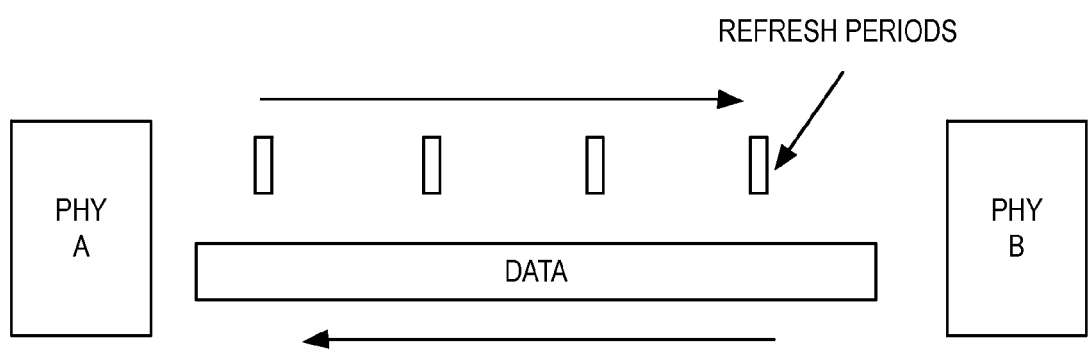

As would be appreciated, the additional benefits afforded by the asymmetric low power idle mode is more pronounced in those cases where traffic appears primarily in one direction. FIG. 6 illustrates such a scenario that represents a traffic profile of an asymmetric traffic pattern such as a video surveillance link. As illustrated, entry into a low power idle mode in only one direction is enabled while the other direction transmits a continual stream of data. This again is in contrast to the transmission of normal idle signals in the example illustrated in FIG. 3.

In an asymmetric low power idle mode, two additional low power idle states can be defined. In a first low power idle state, the transmitter is active and the receiver is in low power idle mode, while in a second low power idle state, the receiver is active and the transmitter is in low power idle mode. This is in contrast to conventional low power idle modes where both the transmitter and receiver are active, or where both the transmitter and receiver are in low power idle mode.

In the present invention, it is recognized that new challenges exist for digital signal processing (DSP) blocks to enables these two new asymmetric low power idle mode states. For example, consider an asymmetric low power idle state where the receiver is active and the transmitter is in a low power idle mode. Here, when data is being received, turning off the transmitter would affect echo/next responses. Thus, in one embodiment, the transmitter can be configured to send zeros until the echo/next cancellers buffers are filled with all zeros before turning off. Sending zeros during the wake up of the transmitter can also be used to avoid initial unstable conditions of the transmitter.

In another example, consider an asymmetric low power idle state where the transmitter is active and the receiver is in a low power idle mode. Here, when the transmitter is active, the received echo may be large enough to trigger an analog signal detector. Thus, in one embodiment, the signal level can be checked after the echo/next canceller for receive signal detection. DSP adaptation may therefore need to be managed accordingly to respond during active and stable periods.

While not shown in the figures, there exists a sleep period when a PHY transitions into a low power idle mode. This sleep period can be approximately 200 µs. For gigabit Ethernet, even if a very short data packet needs to be sent, the active period exceeds 216 µs (i.e., sleep time ($T_s$) plus wake up time ($T_w$)). For this reason, waking up one direction of transmission to facilitate small amounts of data represents a significant inefficiency. For traffic profiles that include the transmission of limited amounts of data at infrequent intervals, this can factor can greatly impact the level of energy savings that can be achieved for the network link.

In one embodiment, the refresh periods in asymmetric low power idle mode can be used for transfer of limited amounts of data. In one embodiment, a PHY can signal to the MAC (e.g., using a defined combination of RX_ER, RX_DV and RXD signals at the MAC interface) that the PHY is in a refresh cycle and is ready to send data. The MAC can then choose to use this refresh period for data types that are not delay sensitive. In various examples, the data types that could make use of the refresh periods could be higher layer network management packets, control commands (e.g., video camera commands), uplink data during Internet browsing, or the like. As would be appreciated, the particular mechanism by which the refresh period can communicate limited amounts of data would be implementation dependent. For example, the refresh periods can communicate limited amounts of data that can be recognized using a single refresh period sequence, or two or more refresh period sequences.

In general, the refresh period enables a fixed lower data rate logical channel to be built at the MAC using the PHY refresh periods. In the example of gigabit Ethernet, the refresh periods can potentially provide a slower logical link of up to 10 Mbps using the refresh periods. Significantly, the slower data link is established without having to wake up the PHY. This facilitates greater energy efficiency by enabling the one direction of transmission to remain in a low power idle mode.

In one embodiment, the PHY can include buffers that can enable a continuous slower link at the MAC while utilizing the refresh periods for sending data. When in this mode, the clock between PHY and MAC can be slower.

In general, asymmetric low power idle can reduce power consumption and radiated emissions when applied to asymmetric or other uncorrelated data traffic patterns. The advantage of asymmetric low power idle is an increase in those opportunities to reduce power in either a transmitter or a receiver.

Figure 7:
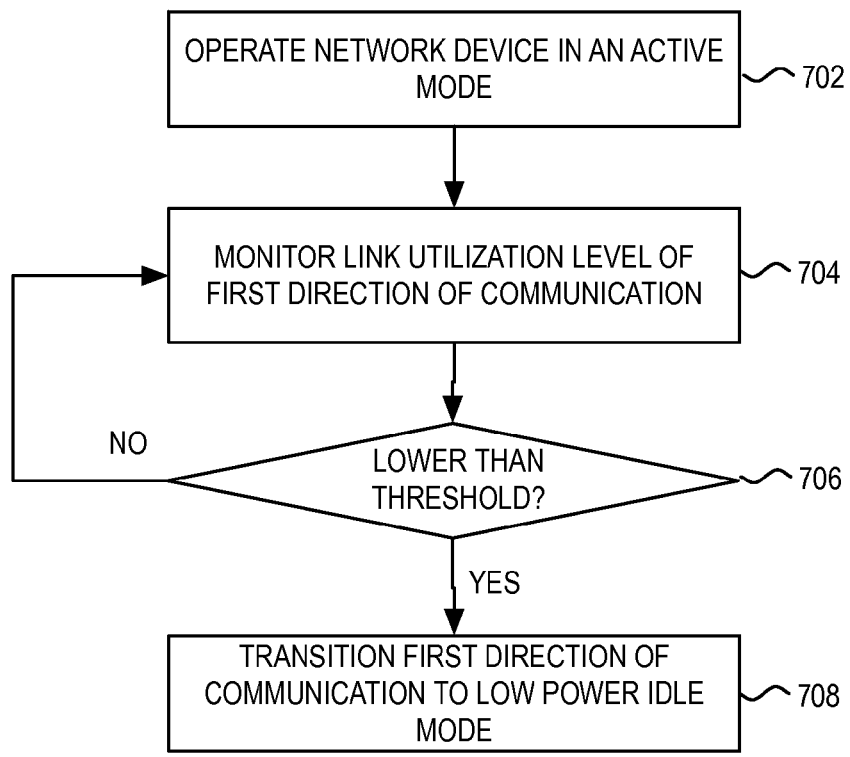
FIG. 7 illustrates a flowchart of a process of the present invention.

Having described an asymmetric low power idle mode, reference is now made to the flowchart of FIG. 7, which illustrates a flowchart of a process using the asymmetric low power idle mode. As illustrated, the process begins at step 702 where a network device begins operation in an active mode where both directions of transmission on a network link operate at a defined data transmission rate. For example, a 1000BASE-T PHY would have both directions operating at a 1 Gbit/s data transmission rate.

At step 704, the network device would then monitor the link utilization level of a first direction of communication while the network device continues to operate in the active mode. In one embodiment, the monitoring is performed by an energy efficiency control policy that is embodied in the network device. As would be appreciated, the energy efficiency control policy can be embodied in one or more layers of the network device. Here, it should be noted that the monitoring of a first direction of communication that is illustrated in FIG. 7 is not intended to be exclusive of monitoring of a second direction of communication. Rather, the example of FIG. 7 is provided to illustrate an asymmetric process.

At step 706, it is then determined whether the link utilization level falls below a threshold value. As would be appreciated, the particular type of threshold value would be dependent on the type of indicators used to determine the link utilization level. In one example, the link utilization level can be determined based on traffic queue or buffer levels, one or more device or subsystem states, application activity, etc. Regardless of the type of indicator(s) used, the monitoring of the link utilization relative to a threshold level can be used to determine whether an asymmetric low power idle mode can be entered by the network device.

Specifically, if it is determined at step 706 that the monitored link utilization level in the first direction of communication does not fall below a threshold value, then the process would continue to operate in the active state and monitoring would continue at step 704. If, on the other hand, it is determined at step 706 that the monitored link utilization level in the first direction of communication does fall below a threshold value, then the process would continue to step 708 where the first direction of communication can be transitioned into a low power idle mode.

In this process, an energy efficiency control policy can produce control signals that would instruct the components in one direction of transmission to enter into a low power idle mode. For example, the energy efficiency control policy can produce control signals that would instruct the transmission subsystem to enter a low power idle mode, or can produce control signals that would instruct the receiving subsystem to enter a low power idle mode. In one embodiment, the control signals for transitioning into an asymmetric low power idle mode can be produced by the MAC. In another embodiment, the control signals for transitioning into an asymmetric low power idle mode can be produced inside the PHY, which analyzes the traffic received from the MAC.

As has been described, the definition of an asymmetric low power idle mode can enhance energy savings by removing barriers to entry into a low power idle mode that exist due to a requirement of inactivity on both directions of communication.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   operating a network device in an active mode where a physical layer device in said network device communicates with a link partner over a network link at a one Gbit/s transmission rate in both directions of communication;
   monitoring, by said network device, a link utilization level for a first direction of communication over said network link; and
   transitioning, in response to said monitoring, said physical layer device from said active mode to an asymmetric low power idle mode, wherein said asymmetric low power idle mode supports a configuration of said physical layer device where said first direction of communication is inactive between a transmission of periodic refresh signals that are configured to maintain synchronization of said first direction of communication, and said second direction of communication that is opposite said first direction of communication continues to communicate at said one Gbit/s transmission rate, wherein said periodic refresh signals used in said first direction of communication while in said asymmetric low power idle mode enables communication of data bits that creates a fixed data rate logical channel having a data transmission rate lower than one Gbit/s.

2. The method of claim 1, wherein said first direction of transmission is transmission from said network device to said link partner.

3. The method of claim 1, wherein said first direction of transmission is transmission from said link partner to said network device.

4. The method of claim 1, wherein said physical layer device is a 1000BASE-T physical layer device.

5. The method of claim 1, wherein said network link is a video surveillance camera link.

6. The method of claim 1, wherein said fixed data rate logical channel has a 10 Mbit/s data rate.

7. A method, comprising:
   operating a network device in an active mode where a physical layer device in said network device supports bi-directional communication with a link partner over a network link at a defined data transmission rate; and
   transitioning, in response to a link utilization level analysis, said physical layer device from said active mode to an asymmetric low power idle mode, wherein said asymmetric low power idle mode supports a configuration of said physical layer device where a first direction of communication operates at said defined data transmission rate and a second direction of communication is inactive between a transmission of periodic refresh signals that are configured to maintain synchronization of said second direction of communication, wherein said periodic refresh signals used in said second direction of transmission while in said asymmetric low power idle mode enables communication of data bits that creates a fixed data rate logical channel having a maximum data rate that is lower than said defined data transmission rate.

8. The method of claim 7, wherein said first direction of transmission is transmission from said network device to said link partner.

9. The method of claim 7, wherein said first direction of transmission is transmission from said link partner to said network device.

10. The method of claim 7, wherein said physical layer device is a 1000BASE-T physical layer device.

11. The method of claim 7, wherein said network link is a video surveillance camera link.

12. The method of claim 7, wherein said logical channel is a fixed data rate logical channel having a 10 Mbit/s data rate.

13. A network device, comprising:
   a transmitter that is configured to transmit at a one Gbit/s transmission rate with a link partner device via a network link;
   a receiver that is configured to receive at said one Gbit/s transmission rate with said link partner device via said network link; and
   an energy efficiency control policy that is configured to analyze a link utilization level of a first direction of communication over a network link that couples the network device to said link partner device, said energy efficiency control policy further configured to transition, in response to said analysis, the network device to an asymmetric low power idle mode, wherein said asymmetric low power idle mode supports a configuration of said transmitter to an inactive state between a transmission of periodic refresh signals that are configured to maintain synchronization with said link partner device, and a configuration of said receiver to receive data at said one Gbit/s transmission rate, wherein said periodic refresh signals used by said transmitter in said asymmetric low power idle mode enables communication of data bits that creates a fixed data rate logical channel having a data transmission rate lower than one Gbit/s.

14. The network device of claim 13, wherein said transmitter and said receiver are part of a 1000BASE-T physical layer device.

15. The network device of claim 13, wherein said fixed data rate logical channel has a 10 Mbit/s data rate.

* * * * *